United States Patent
Ott et al.

(10) Patent No.: US 10,589,844 B2
(45) Date of Patent: Mar. 17, 2020

(54) METHOD OF CONTROLLING AERODYNAMIC MEANS OF AN AIRCRAFT, AN ASSOCIATED CONTROL SYSTEM, AND AN AIRCRAFT PROVIDED WITH SUCH A CONTROL SYSTEM

(71) Applicant: AIRBUS HELICOPTERS, Marignane (FR)

(72) Inventors: Adrien Ott, Salon de Provence (FR); Romeo Byzery, Marseilles (FR); Jean-Baptiste Vallart, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 506 days.

(21) Appl. No.: 15/180,651

(22) Filed: Jun. 13, 2016

(65) Prior Publication Data

US 2017/0001713 A1 Jan. 5, 2017

(30) Foreign Application Priority Data

Jun. 30, 2015 (FR) ..................................... 15 01375

(51) Int. Cl.
*B64C 13/04* (2006.01)
*B64C 13/12* (2006.01)
(Continued)

(52) U.S. Cl.
CPC .......... *B64C 13/0421* (2018.01); *B64C 13/12* (2013.01); *B64C 13/505* (2018.01);
(Continued)

(58) Field of Classification Search
CPC ... B64C 13/04; B64C 13/042; B64C 13/0421; B64C 13/0423; B64C 13/0427;
(Continued)

(56) References Cited

U.S. PATENT DOCUMENTS

| 4,688,443 A | 8/1987 | Fabre et al. |
| 5,404,305 A | 4/1995 | Stiles, Jr. |

(Continued)

FOREIGN PATENT DOCUMENTS

| CN | 102343977 A | 2/2012 |
| CN | 102452478 A | 5/2012 |

(Continued)

OTHER PUBLICATIONS

First Office Action for Chinese Application No. 201610504016.5, dated Mar. 16, 2018, 9 pages.

(Continued)

*Primary Examiner* — Richard R. Green
(74) *Attorney, Agent, or Firm* — Brooks Kushman P.C.

(57) ABSTRACT

A control method for controlling aerodynamic means of an aircraft having mechanically decoupled flight controls enabling the aircraft to be piloted by at least two pilots. The aircraft has at least two control members operated by respective ones of the at least two pilots and each enabling control signals to be generated for causing the aerodynamic means to move relative to an incident air stream. The control method includes piloting logic ("operational" logic). The operational logic includes a dual operating mode in which each control member can control the aerodynamic means. In the dual operating mode, only one of the at least two control members, (the "activated" member), has exclusive control over a full travel amplitude of the aerodynamic means. The other control member, (the "deactivated" member), then is temporarily inoperative on the aerodynamic means.

14 Claims, 2 Drawing Sheets

(51) Int. Cl.
*B64C 13/50* (2006.01)
*B64C 39/02* (2006.01)

(52) U.S. Cl.
CPC .......... *B64C 13/506* (2018.01); *B64C 13/507* (2018.01); *B64C 39/024* (2013.01)

(58) Field of Classification Search
CPC ......... B64C 13/08; B64C 13/12; B64C 13/14; B64C 13/22; B64C 13/343; B64C 13/345; B64C 13/44; B64C 13/46; B64C 13/507
See application file for complete search history.

(56) References Cited

U.S. PATENT DOCUMENTS

| | | | |
|---|---|---|---|
| 6,459,228 B1 | 10/2002 | Szulyk et al. | |
| 8,050,780 B2 * | 11/2011 | Tessier | B64C 13/12 244/229 |
| 8,469,317 B2 | 6/2013 | Burroughs et al. | |
| 8,814,103 B2 * | 8/2014 | Szulyk | B64C 13/12 244/223 |
| 8,935,015 B2 * | 1/2015 | Olsoe | B64C 13/42 701/3 |
| 9,405,312 B2 | 8/2016 | Stachniak et al. | |
| 9,690,291 B2 * | 6/2017 | Ouellette | G05D 1/0077 |
| 2011/0251739 A1 | 10/2011 | Tomas et al. | |
| 2012/0053735 A1 | 3/2012 | Tessier et al. | |

FOREIGN PATENT DOCUMENTS

| | | |
|---|---|---|
| EP | 2518578 | 10/2012 |
| EP | 2857312 | 4/2015 |
| GB | 2501643 A | 10/2013 |
| RU | 2015064 C1 | 6/1994 |
| RU | 114939 U1 | 4/2012 |
| RU | 201113178 A | 10/2012 |
| WO | 03/040844 A2 | 5/2003 |
| WO | 2014199212 | 12/2014 |

OTHER PUBLICATIONS

French Search Report for French Application No. FR 1501375, Completed by the French Patent Office on Apr. 21, 2016, 7 Pages.
Russian Search Report dated Nov. 28, 2017, Registration No. 2016123832/11(037340), Applicant Airbus Helicopters, FR,—2 pages.

* cited by examiner

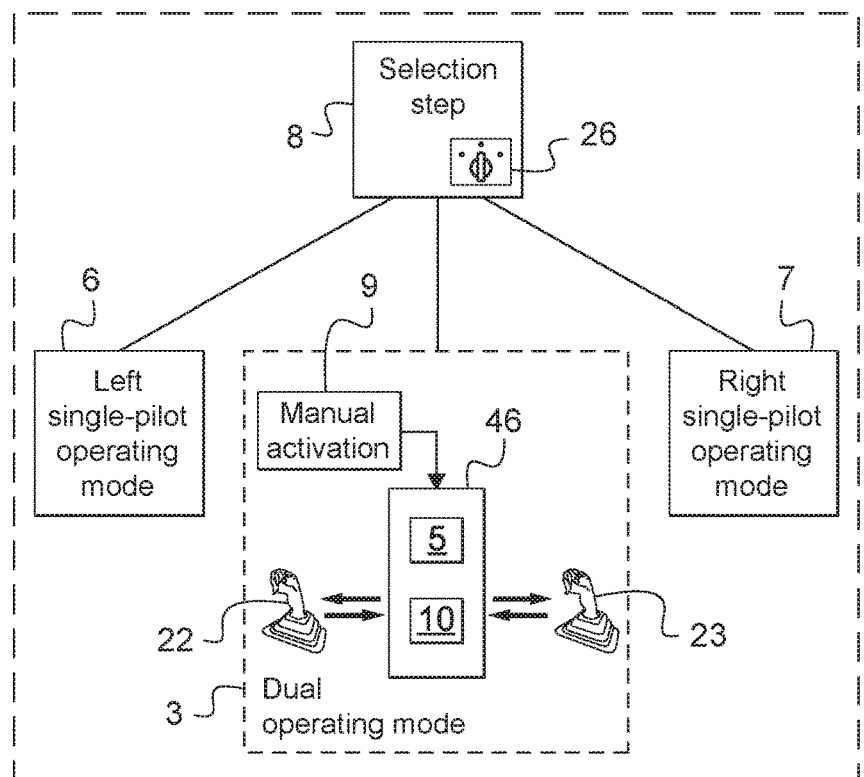
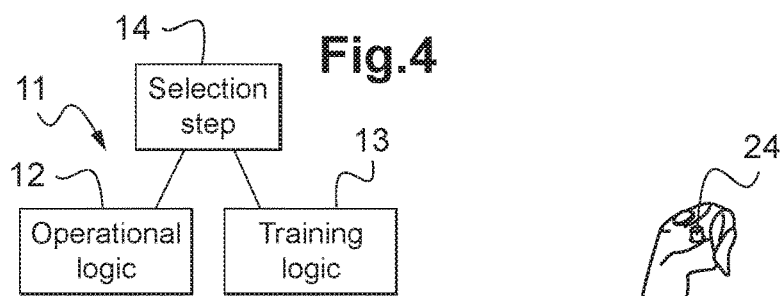
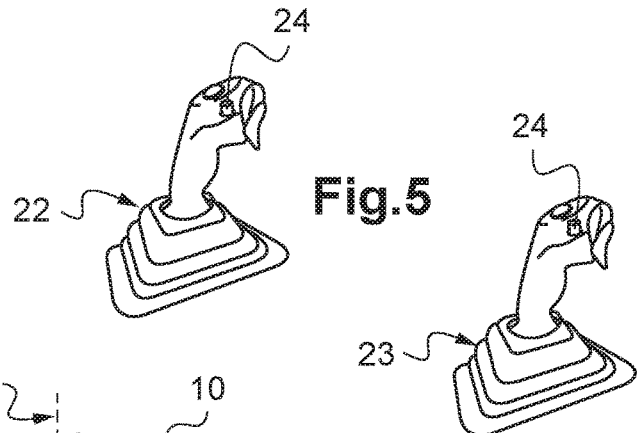
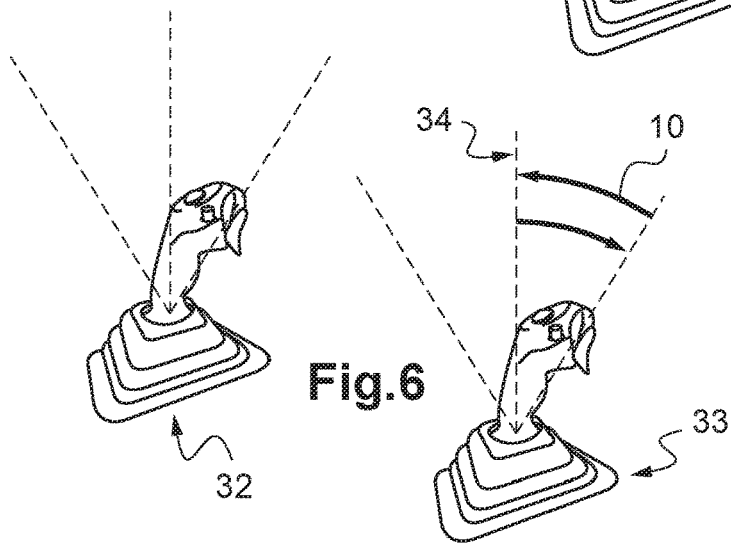

METHOD OF CONTROLLING AERODYNAMIC MEANS OF AN AIRCRAFT, AN ASSOCIATED CONTROL SYSTEM, AND AN AIRCRAFT PROVIDED WITH SUCH A CONTROL SYSTEM

CROSS REFERENCE TO RELATED APPLICATION

This application claims priority to French patent application No. FR 15 01375 filed on Jun. 30, 2015, the disclosure of which is incorporated in its entirety by reference herein.

BACKGROUND OF THE INVENTION (1) Field of the Invention

The present invention relates to the field of piloting an aircraft such as an airplane or a rotorcraft by means of at least two flight control members.

(2) Description of Related Art

Thus, below in the present application, the term "control member" is used to cover any control device suitable for being moved by a pilot or automatically, whether in a cockpit or outside the aircraft when the aircraft has a pilot who is not on board. Such control members may thus be in various forms and in particular they may be in the form of a lever, a stick, a joystick, or indeed in the form of pedals.

These control members then enable aerodynamic means to be moved relative to an incident air stream on a fuselage of the aircraft. In an airplane, such as aerodynamic means may then be constituted either by flaps, ailerons, or wind spoilers, or indeed a rudder or an elevator.

For a rotorcraft, such aerodynamic means may correspond to a collective pitch angle or to a cyclic pitch angle of the blades of a main rotor, or to a collective pitch angle of the blades, in particular of a tail rotor, for example.

More particularly, the invention relates to a method of controlling aerodynamic means of an aircraft, to an associated control system, and to an aircraft provided with the control system.

In general manner, aircraft that are piloted by two pilots have conventional flight control members that are mechanically coupled together and that individually or simultaneously serve to move a mechanical connection enabling the positioning of aerodynamic means to be modified relative to an incident air stream.

Nevertheless, there also exist electrical flight control members that are manually actuated by pilots and that also serve to generate control signals in the form of electrical signals representative of the positions of each of the control members.

Furthermore, with the appearance of electrical flight control members, it is no longer necessary to couple together two control members enabling each of the pilots to pilot the aircraft manually, either simultaneously or in alternation. In particular, such mechanical coupling is of no use for joysticks that are used specifically for controlling the aircraft in pitching and in roll, while making use of very small movements of the control member. Omitting such mechanical coupling is advantageous in that it enables the ergonomics of the cockpit of such a two-pilot type of aircraft to be improved.

Thus, and as described in particular in Document WO 2014/199212, it is known to use electrical flight control members ("fly-by-wire") that are not mechanically coupled together. Nevertheless, under such circumstances, the dual operating mode in which each control member can control the aerodynamic means defaults to control logic of algebraically summing the control signals generated simultaneously by the two control members.

Thus, the resulting control setpoint could be zero, if the two control members are moved in opposite directions. Such a zero control setpoint then does not lead to any modification in the path of the aircraft, which can be dangerous when piloting certain aircraft that must respond rapidly to control signals. For example, with rotorcraft, it is necessary by default for one of the two pilots to be able to act quickly in order to correct a path. That pilot must thus have full control authority enabling the aerodynamic means to be moved over a full travel amplitude.

Furthermore, Document WO 2014/199212 does indeed describe an operating mode in which one of the control members can have priority over the second control member. Under such circumstances, a priority button enables priority to be given to only one of the two control setpoints issued by one of the two control members.

Nevertheless, under such circumstances, the logic of algebraically summing the control setpoints is conserved. Consequently, the control member that has priority over the second member does not have full authority over the aerodynamic means of the aircraft. In other words, even if such a priority button enables one of the two control members to be made inoperative, it does not enable the priority control member to control the aerodynamic means of the aircraft over a full travel amplitude.

Elsewhere, Documents EP 2 857 312 and U.S. Pat. No. 5,404,305 describe the general principle of a control system enabling an aircraft to be piloted by two pilots, each operating a respective control member.

Nevertheless, those two documents relate solely to a "training" mode corresponding to control logic involving summing of the control setpoints from the two control members, as described in Document WO 2014/199212.

Finally, control systems are also known, as described by Documents US 2012/053735 and EP 2 518 578, in which a single aircraft pilot can take control of the aerodynamic means of the aircraft when the autopilot of the aircraft is activated. Under such circumstances, the aerodynamic means of the aircraft can be piloted either by the autopilot or by two control members operated by two pilots with summing logic as described in Document WO 2014/199212.

Nevertheless, under such circumstances, the described methods and systems do not relate to two control members that are to be moved by respective people such as pilots of the aircraft, each having exclusive control over the control surfaces of an aircraft.

BRIEF SUMMARY OF THE INVENTION

The present invention thus seeks to propose a control method, a control system, and an aircraft that enable the above-mentioned limitations to be overcome. The object of the invention is thus, by default, to guarantee that in a dual operating mode, one of the pilots has exclusive control of the aircraft so as to enable that pilot to pilot the path of the aircraft manually and consequently have full control authority in the event of making an urgent path correction.

The invention thus provides a control method for controlling aerodynamic means of an aircraft having mechanically decoupled flight controls enabling the aircraft to be piloted by at least two pilots. The aircraft has at least two control members for being operated by respective ones of the at least two pilots and each enabling control signals to be generated for causing the aerodynamic means to move relative to an incident air stream.

In addition, such a control method uses piloting logic referred to as "operational" logic, the operational logic including a dual operating mode in which each control member can control the aerodynamic means.

This method is remarkable in that firstly the dual operating mode, only one of the at least two control members, referred to as the "activated" member has exclusive control over a full travel amplitude of the aerodynamic means, the other control member, referred to as the "deactivated" member then being temporarily inoperative on the aerodynamic means, and secondly in that in the dual operating mode, it is possible to manually activate the deactivated member, thereby automatically deactivating the activated member, the initially deactivated member being newly activated to control the aerodynamic means over their full travel amplitude.

In other words, and in a first implementation, with such a control method in dual operating mode, it is not possible for both pilots to pilot the aircraft simultaneously. Conversely, each pilot can act in alternation and exclusively to control the aerodynamic means with full authority corresponding to a full travel amplitude of each aerodynamic means.

The term "in alternation" is used to mean that the first pilot can take control by activating the control member, and as soon as the control member is activated, the control member of the second pilot simultaneously becomes the deactivated control member. Thus, and with the exception of particular situations described below, the second pilot can then likewise take over the controls, with the second pilot's control member becoming an activated member while the first pilot's control member then becomes the deactivated member.

Such full authority exclusivity for both of the control members is consequently different from the summing of authority from the control members as is commonly used in aircraft control methods in which piloting is performed using two control members that are mechanically uncoupled.

Furthermore, it should be observed that the method of the invention requiring at least two control members for being operated by respective ones of the at least two pilots, specifically excludes an autopilot type device of the aircraft. In other words, such autopilot type devices do not constitute control members for being manually operated by a person such as an aircraft pilot.

Furthermore, in order to know which pilot has a control member that is activated, the control method may generate sensory information signals suitable for delivering visual and/or audible information. Such sensory signals can thus consist in visual indications on a screen, dedicated indicator lights, audible alarms, or indeed explicit voice messages informing the pilots which is the activated control member.

In addition, and preferably as explained above, as soon as a pilot activates an initially deactivated control member, that automatically deactivates the other initially activated control member. Furthermore, such manual activation of a deactivated member can be performed in various ways in different implementations, as described below.

Thus, in a first implementation, the deactivated member may be activated manually by a pilot in charge of the deactivated member pressing an activation button.

Naturally and by way of example, such an activation button may be arranged directly on the initially deactivated control member. Pressing on this activation button can then easily be done, e.g. by the pilot using the thumb or index finger.

In a second implementation, the deactivated member may be activated manually by a pilot in charge of the deactivated member moving the deactivated member.

Under such circumstances, the manual activation may be performed automatically and directly by moving the initially deactivated control member relative to its support, or more generally to a structure of the aircraft.

In a third implementation, the deactivated member may be activated manually in two different ways by a pilot in charge of the deactivated member. The deactivated member may then be activated manually either by pressing on an activation button, in accordance with the first implementation, or else by moving the deactivated member, in accordance with the second implementation.

Thus, the pilot in charge of the deactivated member can select the means for enabling the pilot to activate the deactivated member manually.

In practice, the deactivated member may be held in position by a holding force. Such a holding force on the deactivated member then provides a sensory signal that is immediately perceptible, enabling the pilot using this member to identify it as being in the deactivated state.

Advantageously, the deactivated member may be held in position in a central position referred to as a "neutral" position, corresponding to the middle of the full movement stroke of the deactivated member while it is activated.

In other words, when a control member is deactivated, it may be returned to the neutral position prior to being held in that position. To place the control member in the neutral position, various solutions can be envisaged.

In a first solution, the pilot may exert manual force on the control member towards the neutral position. Under such circumstances, the control member may be of the passive type, such that it is not servo-controlled in position.

In a second solution, the control member may return automatically to the neutral position by virtue of resilient return means for a control member of the passive type or by virtue of motor-driven means for a control member of the active type and such that it is servo-controlled in position by the motor-driven means.

Furthermore, such a force for holding the deactivated member in position may optionally be suitable for being manually overcome by the pilot. That gives rise to two mutually distinct implementations.

Thus, in a first variant, the holding force may be greater than a threshold value and may serve to prevent any manual actuation of the deactivated member by a pilot of the aircraft.

In this way, the deactivated member is held in position permanently and the pilot cannot manually actuate the deactivated member without previously activating it, e.g. by means of manual activation consisting in using an activation button.

In a second variant, the holding force may be less than a threshold value and may be suitable for being overcome by a pilot of the aircraft manually actuating the deactivated member.

Thus, the deactivated member is held in position in temporary manner. Under such circumstances, the pilot can manually actuate the deactivated member directly without previously activating it.

Under such circumstances, overcoming the holding force of the deactivated member can lead to the deactivated member being activated manually.

In addition, such manual activation of the deactivated member is thus automatic and intuitive once the pilot who seeks to take over the controls of the aircraft has overcome the locking force.

Advantageously, each new manual activation of a newly activated but initially deactivated member may cause reactivation of a newly deactivated but initially activated member to be prohibited, at least for a predetermined duration.

In other words, such prohibition makes it possible automatically and temporarily to inhibit immediate reactivation of a newly deactivated control member. Such prohibition of reactivation thus makes it possible to make operation of the dual operating mode of the control method safer.

In practice, one of the pilots of the aircraft may select to prohibit reactivation of a newly deactivated but initially activated member, at least for a predetermined duration, by means of a first selector element that is operable solely by the pilot.

Under such circumstances, the pilot in charge of actuating the first selection element can select to prohibit immediate reactivation of the member that has just been deactivated. Thus, when this prohibition of reactivation is selected, the pilot in charge of the initially activated control member that has newly been deactivated may be obliged to wait for the predetermined duration before being able to reactivate that pilot's control member. In practice, the predetermined duration may lie in the range one second to three seconds, if this duration expires automatically, or it may be a duration that expires at the initiative of the pilot originating the prohibition of immediate reactivation.

Furthermore, manual activation of the deactivated member and prohibition of immediate reactivation may be performed simultaneously using single means.

In other words, the prohibition of immediate reactivation may be performed together with activating a deactivated member. The single means may thus consist either in an activation button, or else more directly in voluntary manual deflection of the control member that was initially held in position because it was deactivated.

Furthermore, when a prohibition on an immediate reactivation is in force and manual activation of the deactivated member can be performed either by pressing an activation button or by moving the deactivated member, it is then possible to envisage that the prohibition on immediate reactivation applies only in the event of the deactivated member being activated manually by being moved.

Under such circumstances, the newly deactivated member can be activated manually only by pressing on the activation button, which then makes it possible to inhibit the prohibition of immediate reactivation of this newly deactivated member, and consequently enables such a newly deactivated member to be reactivated immediately.

Advantageously, the operational logic may include at least one single-pilot operating mode in which:
  only one of the at least two control members, referred to as the "activated" member, enables the aerodynamic means to be controlled exclusively and over a full travel amplitude, the other control member, referred to as the "deactivated" member, then being inoperative on the aerodynamic means; and
  the activated member always remains activated and the deactivated member always remains deactivated.

In this way, the method also has a single-pilot operating mode in which it is not possible for a pilot having a deactivated control member to take control of the aircraft. It is only the pilot who has the activated control member that can generate signals for controlling aerodynamic means of the aircraft.

The operational logic of the method may also enable the operating mode chosen by the pilot(s) to be selected before any mission of the aircraft, and this operating mode may subsequently be modified in flight, under certain conditions.

In practice, the operational logic thus includes the dual operating mode and may include two single-pilot operating modes corresponding to a left single-pilot mode in which the activated member is the member arranged on the left of a cockpit of the aircraft, and a right single-pilot mode in which the activated member is the member arranged on the right of a cockpit of the aircraft. The aircraft may then include a switch enabling one or the other of the two single-pilot operating modes to be selected manually. Furthermore, under such circumstances, manual activation of the deactivated member in the dual operating mode is performed by other means that are distinct from the switch enabling the single-pilot operating mode of the operational logic to be selected.

In other words, the operational logic may enable a single one of the pilots to take control of the aircraft by activating the left control member or the right control member of the aircraft. This selection of which control member is to be activated may be performed by the pilot before a mission of the aircraft and, under certain conditions, may optionally be modified in flight.

Furthermore, such a switch enabling one or other of the two single-pilot operating modes to be selected can under no circumstances manually activate a deactivated member relating to the dual operating mode, with that being done either by means of an activation button or by means of moving or tilting the deactivated member directly.

Advantageously, the switch may also enable the dual operating mode to be selected.

In this way, with only one switch, the pilot(s) can decide whether or not to give piloting rights to various pilots of the aircraft. Such a switch may then consist in a switch having three stable positions, in particular a switch such as a rotary knob, e.g. with a first position corresponding to the left single-pilot operating mode, a central, second position corresponding to the dual operating mode, and a third position corresponding to the right single-pilot operating mode.

Advantageously, the control method may include other logic, referred to as "training" logic, which, when activated by a second selector element, deactivates the operational logic. In training logic, the at least two control members can then be activated simultaneously in order to control the total travel amplitude of the aerodynamic means by summing their control engines.

Under such circumstances, and in a second implementation, there is no longer exclusivity between two control members of the aircraft that are activated simultaneously. Each of the control members can then be used simultaneously to provide a control signal to a control system. The control system then generates the control setpoint for the aerodynamic means as a function of summing control signals representative of the current positions of the at least two control members.

The present invention thus also provides a control system for controlling aerodynamic means of an aircraft having mechanically decoupled flight controls enabling the aircraft to be piloted by at least two pilots, such a control system including at least two control members for being operated by respective ones of the at least two pilots and each enabling a control signal to be generated. The control signals are then transmitted to a processor unit of the control system so as to generate control setpoints for at least one actuator that moves the aerodynamic means relative to an incident air stream.

Such a control system is remarkable in that it performs the above-specified control method.

In other words, such a control system may include at least one processor unit such as a computer, in order to generate the control setpoint for the aerodynamic means of the aircraft as a function of control signals generated by the at least two control members.

Furthermore, when using operational logic and the dual operating mode, such a processor unit also makes it possible to activate and deactivate the various control members in alternation.

Finally, the invention also provides an aircraft having mechanically decoupled flight controls including a control system for controlling aerodynamic means and enabling the aircraft to be piloted. In addition, such a control system includes at least two control members, each serving to generate a control signal. As mentioned above, these control signals are then transmitted to a processor unit of the control system in order to generate control setpoints for at least one actuator serving to move the aerodynamic means relative to an incident air stream.

The control system of such an aircraft is selected in accordance with the control system as described above.

Thus, such an aircraft has a control system for controlling aerodynamic means of an aircraft, the control system having at least two control members for being operated by respective ones of at least two pilots, and a processor unit performing a dual operating mode in which each control member can control the aerodynamic means, and in which:

only one of the at least two control members, referred to as the "activated" member, acts exclusively to control the aerodynamic means over a full travel amplitude, while the other control member, referred to as a "deactivated" member, is then temporarily inoperative on the aerodynamic means; and each of the two control members is activated in alternation in order to control the aerodynamic means exclusively.

In practice, such an aircraft may include data link means for receiving at least control setpoints from an additional control member outside the aircraft. The additional control member thus enables one of the two control members of the aircraft to be a remote control.

Under such circumstances, there may be only one pilot at the controls in the aircraft. By way of example, the additional control member is then arranged in a piloting station on the ground and the data link means then enable the operational logic and its dual mode to be implemented in distributed manner between the piloting station on the ground and the piloting station in the aircraft where there is a pilot at the controls.

BRIEF DESCRIPTION OF THE SEVERAL VIEWS OF THE DRAWINGS

The invention and its advantages appear in greater detail from the context of the following description of implementations given by way of non-limiting indication, and in which:

FIG. 3 is a logical diagram showing the first implementation of the control method in accordance with the invention;

FIG. 4 is a logical diagram showing the second implementation of a control method in accordance with the invention;

FIG. 5 is a perspective view showing a first example of control members of an aircraft in accordance with the invention; and FIG. 6 is a perspective view showing a second example of control members of an aircraft in accordance with the invention.

Elements shown in more than one of the figures are given the same references in each of them.

DETAILED DESCRIPTION OF THE INVENTION

As mentioned above, the invention relates to an aircraft with electrical flight control ("fly-by-wire") for piloting it. Such an aircraft is also suitable for enabling two pilots to pilot it using two electrical flight control members that are not mechanically coupled together.

Figure 1:
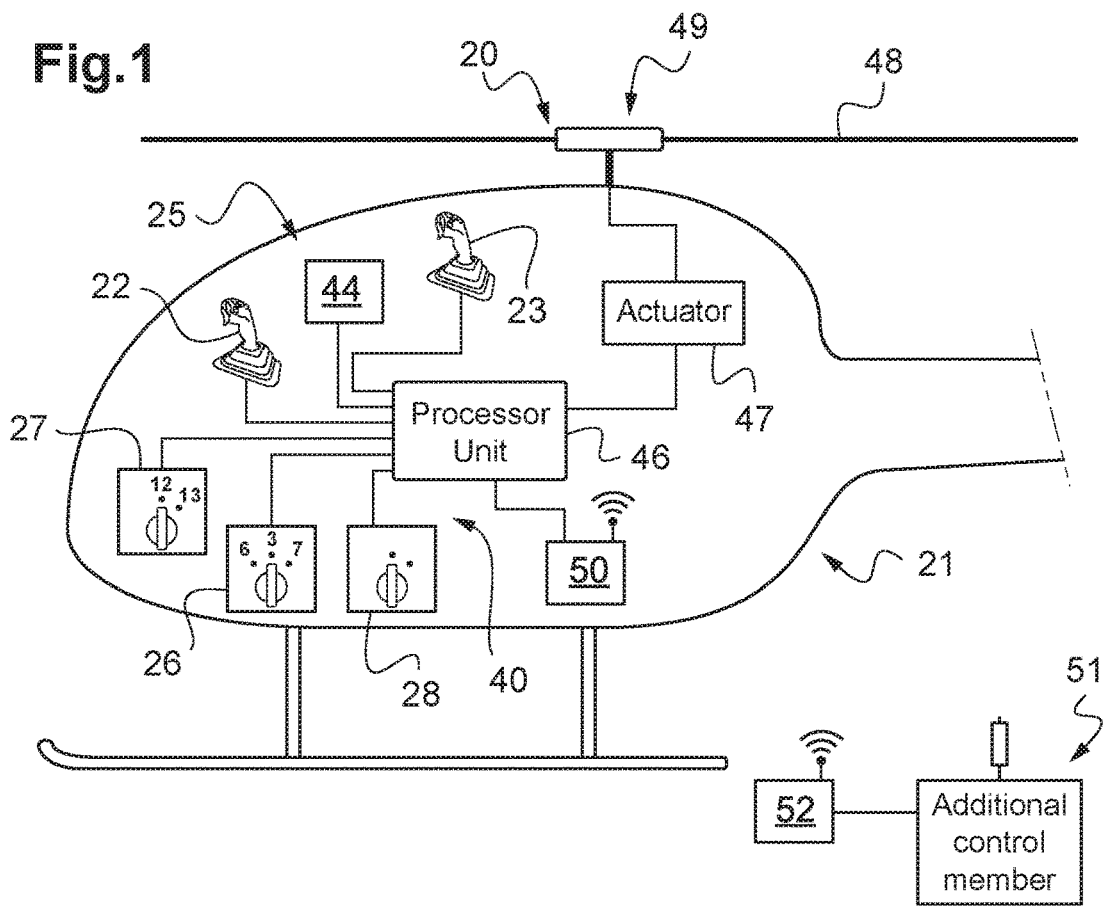
FIG. 1 is a side view of an aircraft in accordance with the invention suitable for performing first and second implementations of the control method.

In this way, and as shown in FIG. 1, the invention relates to an aircraft 21, represented herein by way of example in the form of a rotorcraft.

Such a rotorcraft 21 thus has a control system 40 including a processor unit 46 for generating electrical, optical, or digital control setpoints and for transmitting them to at least one actuator 47 that serves to move aerodynamic means 20 relative to an incident air stream.

Specifically when the aircraft 21 is a rotorcraft, the actuator 47 thus serves to modify the collective pitch and/or the cyclic pitch of the blades 48 of a main rotor 49 of a rotorcraft. Nevertheless, the invention is not limited to this embodiment given by way of indication and it may also apply to an actuator controlled by pedals in order to modify the collective pitch and/or the cyclic pitch of blades of a rotorcraft tail rotor.

Furthermore, in the cockpit 25 of the aircraft 21 there are provided at least two control members 22, 23 capable of being activated exclusively one after the other for piloting the aircraft 21. When activated, each control member 22 and 23 possesses full authority over the travel amplitude of the aerodynamic means 20.

Furthermore, and as shown in FIG. 1, the control members 22 and 23 may in particular be in the form of joysticks suitable, by way of example, for modifying the cyclic pitch and/or the collective pitch of the blades 48 of the main rotor 49 of the aircraft 21.

The cockpit 25 is also provided with a switch 26 enabling at least one of the pilots of the aircraft 21 to select one of three modes of operation 3, 6, and 7 for operational logic 2, 12. With reference to FIG. 3, there follows a description of one such operational logic 2 and its various modes of operation 3, 6, 7 corresponding to the first implementation of the control method 1. Thereafter, the second implementation of the control method 11, which includes both operational logic 12 and training logic 13, is described in greater detail with reference to FIG. 4.

In addition, a first selector element 28 may likewise be installed in the cockpit 25 of the aircraft 21 in order to enable one only of the pilots of the aircraft 21 to authorize or prohibit reactivation, at least for a predetermined duration, of a member 22 that has newly been deactivated but that was initially activated.

In the above-mentioned second implementation, the cockpit 25 of the aircraft 21 also has a second selector element 27 enabling at least one of the two pilots to select exclusively operational logic 12 or else training logic 13.

Furthermore, the cockpit 25 of the aircraft 21 may also be provided with visible or audible information means 44 seeking to generate information and transmit it to the pilots of the aircraft 21, so as to enable them to know which control member 22 or 23 is activated exclusively.

Furthermore, such an aircraft 21 may have data link means 50 serving in particular to receive control setpoints coming from an additional control member 51 outside said aircraft 21.

This additional control member 51 is thus connected to a transmission member 52 to transmit piloting instructions from a remote piloting station of the aircraft 21 to the control system 40 of the aircraft 21. Consequently, the additional control member 51 enables one of the two control members 22, 23 of the aircraft 21 to be remotely controlled.

Thus, the additional control member 51 can contribute to implementing the operational logic 2, 12 and more particularly the dual mode of operation 3 for piloting the aircraft 21 when only one pilot is present in the cockpit 25 of the aircraft 21.

Figure 2:
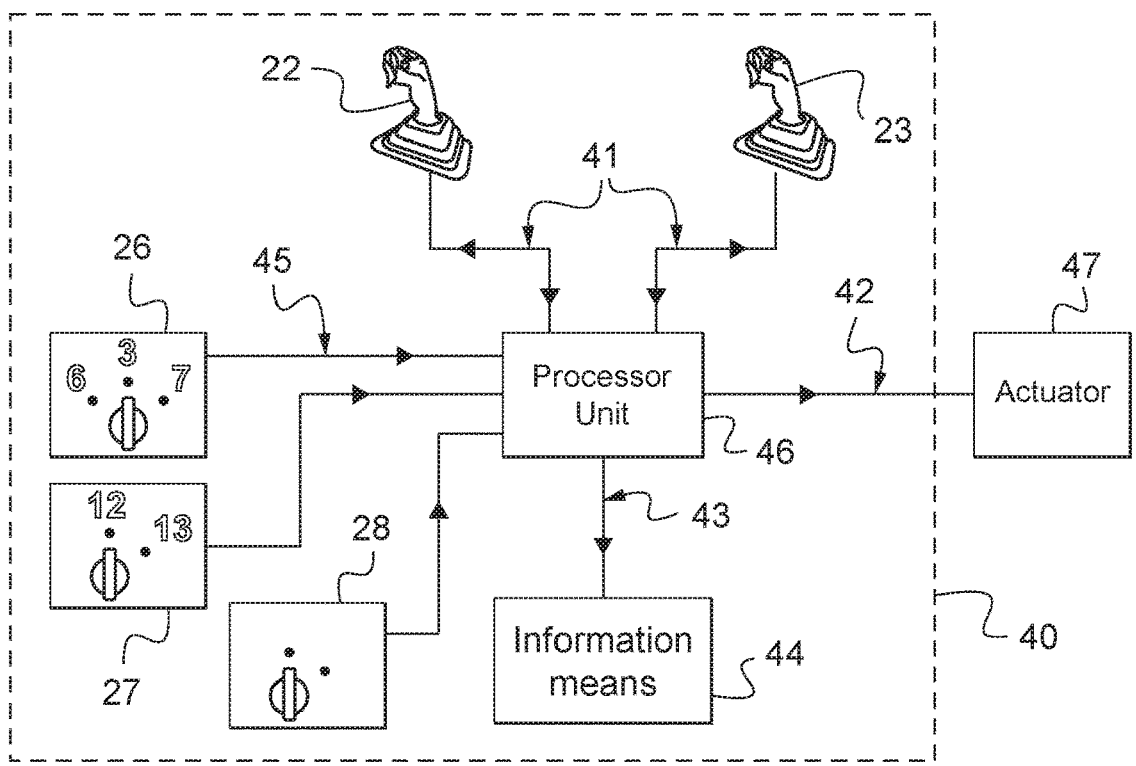
FIG. 2 is a diagrammatic view of a control system in accordance with the invention likewise enabling first and second implementations of the control method to be performed.

As shown in FIG. 2, the invention also relates to a control system 40 for controlling the aerodynamic means 20 of an aircraft 21. Such a control system 40 thus has at least two control members 22, 23, each generating electrical control signals 41 and transmitting them to a processor unit 46.

Such a control system 40 then generates control setpoints 42 for at least one actuator 47 to make it possible to pilot the aircraft 21 by moving the aerodynamic means 20.

Furthermore, such a control system 40 includes a switch 26 enabling at least one of the pilots of the aircraft 21 to select at least one of the operating modes 3, 6 or 7 of operational logic 2, 12, as described below. The central position of the switch 26 corresponds to a dual operating mode 3, the left position of the switch 26 corresponds to a left single-pilot operating mode 6, and the right position of the switch 26 corresponds to a right single-pilot operating mode 7. The switch 26 thus gives instructions 45 to the processor unit 46, these instructions 45 being representative of the operating mode selected by at least one of the pilots.

Furthermore, such a control system 40 may also include information means 44 generating sensory information signals suitable for delivering visual or audible information. Such sensory signals may thus consist in visual indications on a screen, dedicated indicator lights, audible alarms, or indeed explicit voice messages informing the pilot which control member is activated.

To do this, the processor unit 46 then also generates sensory instructions 43 for the information means 44 to enable the pilot to identify visually or audibly which control member 22 or 23 is activated.

As shown in FIGS. 3 and 4, the invention also relates to a control method 1, 11 capable of performing various kinds of logic and various operating modes.

Thus, as shown in FIG. 3 and in a first implementation, the control method 1 has operational logic 2 comprising in particular a dual operating mode 3 in which each control member 22, 23 can control the aerodynamic means 20 of the aircraft 21. Such an operational logic 2 may also include two single-pilot operating modes 6, 7 in which only one of the control members 22, 23 can control the aerodynamic means 20 of the aircraft 21 over its full travel amplitude.

The single-pilot operating modes 6, 7 can then consist in a left single-pilot operating mode 6 in which the left control member 22 possesses full authority over controlling the aerodynamic means 20, and analogously, a right single-pilot operating mode 7 in which the right control member 23 possesses full authority over controlling the aerodynamic means 20.

As shown in FIG. 3, the control method 1 also includes a selection step 8 enabling at least one pilot to select manually the dual operating mode 3 or the single-pilot operating mode 6, 7 by using the switch 26.

Once the dual operating mode 3 has been selected, only one of the two control members, referred to as the "activated" member 22, has exclusive control, with full authority, over the aerodynamic means 20, while the other control member, referred to as the "deactivated" member 23, is temporarily inoperative on the aerodynamic means 20.

Furthermore, in this dual operating mode 3, when manual activation 9 of a deactivated member 23 is detected, the activation is then transmitted to the processor unit 46 and the control method 1 can automatically cause the activated member 22 to be deactivated, the initially deactivated control member 23 being newly activated for using the actuator 47 to control the aerodynamic means 20 over the full travel amplitude.

Furthermore, in the dual operating mode 3, the processor unit 46 may prohibit 5 reactivation, at least for a predetermined duration, of a member 22 that was initially activated but that has newly been deactivated.

Prohibiting 5 reactivation in this way thus makes it possible temporarily to inhibit immediate reactivation of a newly deactivated control member.

As shown in FIG. 4, and in the second implementation, the control method 11 may include not only operational logic 12 equivalent to the operational logic 2 as described with reference to FIG. 3, but also additional training logic 13 that can be activated exclusively. That is to say, when the training logic 13 is activated, it inhibits the operational logic 12.

Unlike the operational logic 12, such training logic 13 enables both control members to be activated simultaneously and enables a control setpoint to be generated for the aerodynamic means 20 that is a function of summing the control signals 41 coming from each of the control members 22, 23.

Furthermore, the control method 11 also includes a selection step 14 distinct from the selection step 8 as described with reference to FIG. 3, for the purpose of selecting the operating mode of the operational logic 2. Such a selection step 13 then consists in selecting exclusively the operational logic 12 or the training logic 13.

As shown in FIG. 5, in a first implementation, an aircraft 21 performing a method 1, 11 in accordance with the invention, has an activated member 22 for exclusively controlling the aerodynamic means 20 of the aircraft 21 and a deactivated member 23 that is inoperative on the aerodynamic means. As shown, the control members 22, 23 are in the form of joysticks and, in a first embodiment, they may include respective activation buttons 24 to enable each of the pilots of the aircraft 21 to generate manual activation 9 as shown in FIG. 3.

In a second embodiment, as shown in FIG. 6, the deactivated member 33 may directly generate the manual activation 9 as previously described, only on deflecting or moving a movable member relative to a support secured to the structure of the aircraft.

Furthermore, the deactivated member 33 may be held in position by a holding force 10 for holding it in a neutral position 34.

The dual operating mode 3 can thus generate a holding force 10 for holding the deactivated member 33 in position. Such a holding force 10 provides tactile information directly to a pilot, informing the pilot that the control member is deactivated.

Furthermore, in order to activate 9 the deactivated member 33 manually, the pilot can thus act manually on the deactivated member 33 arranged in the neutral position 34.

In a first variant, such a holding force 10 may be greater than a threshold value preventing the pilot from actuating the deactivated member 33 manually. Alternatively, and in a second variant, the holding force 10 may be less than a threshold value enabling the pilot to overcome it and actuate the deactivated member 33.

In addition, when a control member is deactivated, it is possible in a first solution, e.g. corresponding to a passive control member, for it to be returned to the neutral position 34 manually by the pilot or automatically by resilient return means. Furthermore, in a second solution, e.g. corresponding to an active control member, the newly deactivated control member can be returned automatically to the neutral position 34 by motor-driven means.

Naturally, the present invention may be subjected to numerous variations as to its implementation. Although several implementations are described, it can readily be understood that it is not conceivable to identify exhaustively all possible implementations. It is naturally possible to envisage replacing any of the means described by equivalent means without going beyond the ambit of the present invention.

Furthermore, it is possible to envisage having a crew made up of a pilot in the aircraft and a pilot on the ground, with a data link between the ground piloting station and the aircraft. Under such circumstances, the unused piloting position in the aircraft is configured in a remotely piloted mode. The two pilots at the controls of the aircraft thus comprise one who is present on board the aircraft and another who is a pilot on the ground having a remote piloting member. The same functions of the operational logic and in particular its dual operating mode can then apply.

It can be seen from the above that a control method in accordance with the invention for controlling aerodynamic means of an aircraft, an associated control system, and an aircraft provided with such a control system present numerous advantages, and in particular they make the following possible:

in the dual operating mode, they enable exclusive piloting to be conserved that is similar to that of a single-pilot operating mode;

they facilitate coordination between the pilots and sharing of piloting tasks;

they guarantee immediate takeover in an emergency by overcoming a locking force on the control member;

they enable conflicts of simultaneous use of the control members to be managed by temporarily inhibiting reactivation of a newly deactivated control member; and they enable additive training logic to be used, which then inhibits the operational logic.

What is claimed is:

1. A control method for controlling aerodynamic means of an aircraft having mechanically decoupled flight control members enabling the aircraft to be piloted by at least two pilots, the aircraft having a first control member on a left side of a cockpit of the aircraft for being operated by a first pilot who is in charge of the first control member and a second control member on a right side of the cockpit of the aircraft for being operated by a second pilot who is in charge of the second control member and each control member enabling control signals to be generated for causing the aerodynamic means to move relative to an incident air stream, the control method using piloting logic referred to as "operational" logic, the operational logic including a dual operating mode, a left single-pilot operating mode, and a right single-pilot operating mode, the aircraft further including a single switch movable between three stable positions including a first position corresponding to the dual operating mode, a second position corresponding to the right single-pilot operating mode, and a third position corresponding to the left single-pilot operating mode, each of the positions of the single switch being reversibly-reachable for manual selection by at least one of the pilots of the dual operating mode in the first position of the single switch, the left single-pilot operating mode in the second position of the single switch, or the right single-pilot operating mode in the third position of the single switch;

wherein in the dual operating mode,
only one of the control members, referred to as the "activated" member, has exclusive control over a full travel amplitude of the aerodynamic means, the other of the control members, referred to as the "deactivated" member, then being temporarily inoperative on the aerodynamic means;
it is possible to manually activate the deactivated member, thereby automatically deactivating the activated member responsive to the deactivated member being activated, the deactivated member being activated becoming the activated member having exclusive control over the full travel amplitude of the aerodynamic means; and
the manual activation of the deactivated member is performed by other means distinct from the single switch;

wherein in the left single-pilot operating mode,
only the first control member, referred to as the "activated" member, has exclusive control over the full travel amplitude of the aerodynamic means, the second control member, referred to as the "deactivated" member, then being inoperative on the aerodynamic means; and
the first control member always remains activated and the second control member always remains deactivated;

wherein in the right single-pilot operating mode,
only the second control member, referred to as the "activated" member, has exclusive control over the full travel amplitude of the aerodynamic means, the first control member, referred to as the "deactivated" member, then being inoperative on the aerodynamic means; and
the second control member always remains activated and the first control member always remains deactivated.

2. The control method according to claim 1, wherein the manual activation of the deactivated member being activated is performed by the pilot in charge of the deactivated member being activated by pressing an activation button.

3. The control method according to claim 1, wherein the manual activation of the deactivated member being activated is performed by the pilot in charge of the deactivated member being activated by moving the deactivated member.

4. The control method according to claim 1, wherein the deactivated member is held in position by a holding force.

5. The control method according to claim 4, wherein the deactivated member is held in position in a central position, referred to as a "neutral" position, corresponding to the middle of the full movement stroke of the deactivated member while it is activated.

6. The control method according to claim 4, wherein the holding force is greater than a threshold value and serves to prevent any manual actuation of the deactivated member by the pilot in charge of the deactivated member.

7. The control method according to claim 4, wherein the holding force is less than a threshold value and is suitable for being overcome by the pilot in charge of the deactivated member actuating the deactivated member manually.

8. The control method according to claim 7, wherein the manual activation of the deactivated member being activated is performed by the pilot in charge of the deactivated member being activated by moving the deactivated member being activated, and wherein overcoming the holding force of the deactivated member being activated causes the deactivated member being activated to be manually activated as a result of the movement of the deactivated member being activated.

9. The control method according to claim 1, wherein each new manual activation of a newly activated but initially deactivated member causes reactivation of a newly deactivated but initially activated member to be prohibited, at least for a predetermined duration.

10. The control method according to claim 9, wherein one of the pilots of the aircraft may select to prohibit reactivation of a newly deactivated but initially activated member, at least for a predetermined duration, by means of a first selector element that is operable solely by the one of the pilots.

11. The control method according to claim 1, wherein the control method includes another piloting logic, referred to as "training" logic, which, when activated by a second selector element, deactivates the operational logic, and wherein, in the training logic, the control members are activated simultaneously for controlling the total travel amplitude of the aerodynamic means by summing.

12. A control system for controlling aerodynamic means of an aircraft having mechanically decoupled flight control members enabling the aircraft to be piloted by at least two pilots, the control system including a first control member on a left side of a cockpit of the aircraft for being operated by a first pilot and a second control member on a right side of the cockpit of the aircraft for being operated by a second pilot and each control member enabling control signals to be generated, the control signals being transmitted to a processor unit of the control system to generate control setpoints for at least one actuator that moves the aerodynamic means relative to an incident air stream, wherein the control system performs a control method according to claim 1.

13. An aircraft having mechanically decoupled flight control members and a control system for controlling aerodynamic means and enabling the aircraft to be piloted by at least two pilots, the control system having a first control member on a left side of a cockpit of the aircraft for being operated by a first pilot and a second control member on a right side of the cockpit of the aircraft for being operated by a second pilot and each control member enabling a control signal to be generated, the control signals being transmitted to a processor unit of the control system to generate control setpoints for at least one actuator that moves the aerodynamic means relative to an incident air stream, wherein the control system is selected in accordance with a control system according to claim 12.

14. The aircraft according to claim 13, wherein the aircraft includes data link means for receiving at least control setpoints from an additional control member outside the aircraft, the additional control member enabling one of the control members of the aircraft to be remotely controlled.

\* \* \* \* \*